United States Patent
Sanders et al.

(10) Patent No.: US 11,573,621 B2
(45) Date of Patent: Feb. 7, 2023

(54) REDUCTION OF PERFORMANCE IMPACTS OF STORAGE POWER CONTROL BY MIGRATION OF WRITE-INTENSIVE EXTENT

(71) Applicant: International Business Machines Corporation, Armonk, NY (US)

(72) Inventors: Lee Jason Sanders, Chichester (GB); Alexander Henry Ainscow, Winchester (GB); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/938,951

(22) Filed: Jul. 25, 2020

(65) Prior Publication Data
US 2022/0026977 A1   Jan. 27, 2022

(51) Int. Cl.
G06F 1/32       (2019.01)
G06F 1/3234     (2019.01)
G06F 1/3296     (2019.01)
G06F 3/06       (2006.01)

(52) U.S. Cl.
CPC .......... *G06F 1/3275* (2013.01); *G06F 1/3296* (2013.01); *G06F 3/0625* (2013.01); *G06F 3/0653* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,882,373 B1* | 2/2011 | More | ................... | G06F 1/3203 |
| | | | | 713/300 |
| 8,782,324 B1* | 7/2014 | Chen | ................... | G06F 3/0649 |
| | | | | 711/102 |
| 10,019,181 B2 | 7/2018 | Singh et al. | | |
| 10,140,036 B2 | 11/2018 | Kelner et al. | | |
| 2003/0185154 A1* | 10/2003 | Mullendore | ............ | H04L 47/30 |
| | | | | 370/236 |
| 2006/0143419 A1* | 6/2006 | Tulyani | ................. | G06F 3/0625 |
| | | | | 711/114 |
| 2007/0061512 A1* | 3/2007 | Taguchi | ................ | G06F 3/3221 |
| | | | | 711/114 |
| 2008/0080131 A1* | 4/2008 | Hori | ...................... | G06F 3/0689 |
| | | | | 361/679.31 |
| 2009/0276565 A1* | 11/2009 | Fujibayashi | ............ | G06F 3/067 |
| | | | | 711/E12.019 |
| 2011/0191558 A1* | 8/2011 | Anderson | ............... | G06F 12/00 |
| | | | | 711/162 |
| 2013/0198468 A1* | 8/2013 | Antony | ................. | G06F 3/0664 |
| | | | | 711/162 |

(Continued)

*Primary Examiner* — Danny Chan
(74) *Attorney, Agent, or Firm* — Peter J. Edwards

(57) ABSTRACT

A set of read operations and a set of write operations for a set of drives in a storage system during a first time window is monitored. A write intensity of a first drive in the set is calculated based on the monitoring. The first drive is classified as a candidate for power reduction based on the write intensity. A write-intensive extent is identified on the first drive based on the monitoring. The write extensive extent is migrated to a second drive in the set of drives, and power to the first drive is reduced.

20 Claims, 5 Drawing Sheets

(56) References Cited

U.S. PATENT DOCUMENTS

| | | | |
|---|---|---|---|
| 2013/0290598 A1* | 10/2013 | Fiske | G06F 3/0625 |
| | | | 711/103 |
| 2014/0068221 A1* | 3/2014 | Feng | G06F 12/023 |
| | | | 711/170 |
| 2015/0127881 A1* | 5/2015 | Montgomery | G06F 3/0641 |
| | | | 711/102 |
| 2015/0331473 A1* | 11/2015 | Jreji | G06F 1/3268 |
| | | | 713/320 |
| 2016/0062421 A1 | 3/2016 | Sugawara et al. | |
| 2016/0085291 A1* | 3/2016 | Ebsen | G06F 3/0625 |
| | | | 713/320 |
| 2017/0118282 A1* | 4/2017 | Lee | H04L 67/322 |
| 2017/0262231 A1* | 9/2017 | Koishi | G06F 3/0659 |
| 2018/0095911 A1* | 4/2018 | Ballapuram | G06F 13/1668 |
| 2018/0181307 A1* | 6/2018 | Oe | G06F 3/068 |
| 2018/0321860 A1 | 11/2018 | Marchenko et al. | |
| 2018/0321864 A1 | 11/2018 | Benisty | |
| 2018/0357013 A1* | 12/2018 | Shi | G11C 11/5642 |
| 2019/0082010 A1 | 3/2019 | Friedman et al. | |
| 2019/0235765 A1* | 8/2019 | Crawford | G06F 3/0653 |
| 2019/0250819 A1* | 8/2019 | Jain | G06F 3/061 |
| 2019/0324899 A1 | 10/2019 | Kulkarni et al. | |
| 2019/0339903 A1* | 11/2019 | Ainscow | G06F 3/0659 |
| 2019/0339909 A1 | 11/2019 | Sethuraman et al. | |
| 2019/0384521 A1* | 12/2019 | Patel | G06F 3/0653 |
| 2020/0004637 A1 | 1/2020 | Zhou et al. | |

* cited by examiner

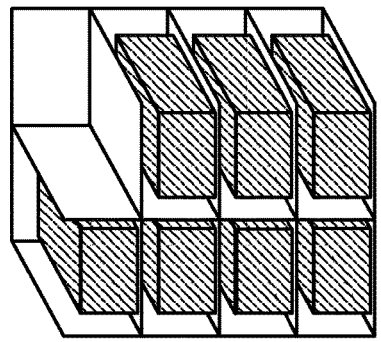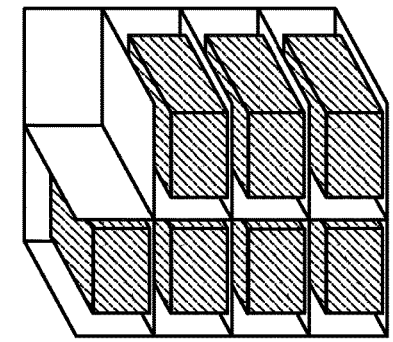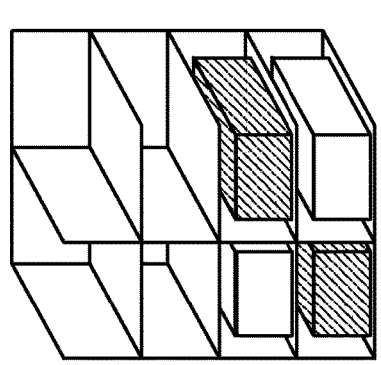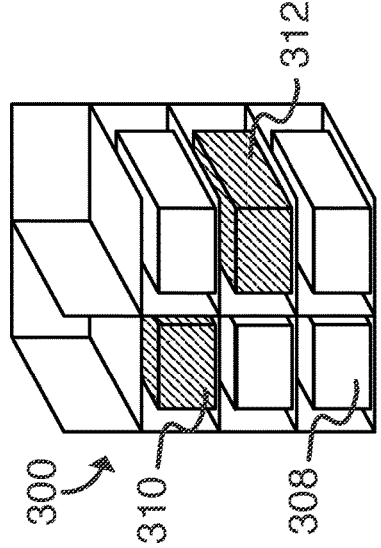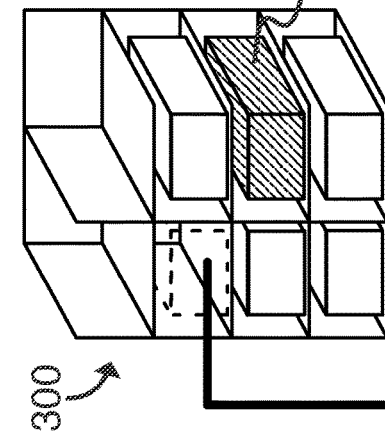
FIG. 3A
FIG. 3B

REDUCTION OF PERFORMANCE IMPACTS OF STORAGE POWER CONTROL BY MIGRATION OF WRITE-INTENSIVE EXTENT

BACKGROUND

The present disclosure relates to storage drives, and more specifically, to controlling power provided to storage drives.

Some storage systems are composed of a storage controller and a set of storage drives. In some such storage systems, data can be migrated from one storage drive to another. This is sometimes performed for performance purposes. The storage controller typically monitors the operations of the storage drive, and is sometimes capable of determining what data to migrate from one storage drive to another storage drive. In some storage systems, the storage controller is also capable of determining the power provided to each storage drive.

Some storage systems include solid state drives (sometimes referred to herein as "SSDs"). These SSDs may sometimes be formatted in a flash protocol (e.g., non-volatile memory express).

SUMMARY

Some embodiments of the present disclosure can be illustrated as a method including monitoring a set of read operations and a set of write operations for a set of drives in a storage system during a first time window. The method also includes calculating a write intensity of a first drive in the set based on the monitoring. The method also includes classifying the first drive as a candidate for power reduction based on the write intensity. The method also includes identifying a write-intensive extent on the first drive. The identifying is also based on the monitoring. The method also includes migrating the write-intensive extent to a second drive in the set of drives. The method includes reducing power to the first drive.

Some embodiments of the present disclosure can also be illustrated as a system or computer program product that is configured to perform the above method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3A depicts first view of an example set of storage drives on which a power-reduction migration may be performed in accordance with embodiments of the present disclosure.

FIG. 3B depicts a second view of the example set of storage drives in which a power-reduction candidate may be identified in accordance with embodiments of the present disclosure.

Figure 1:
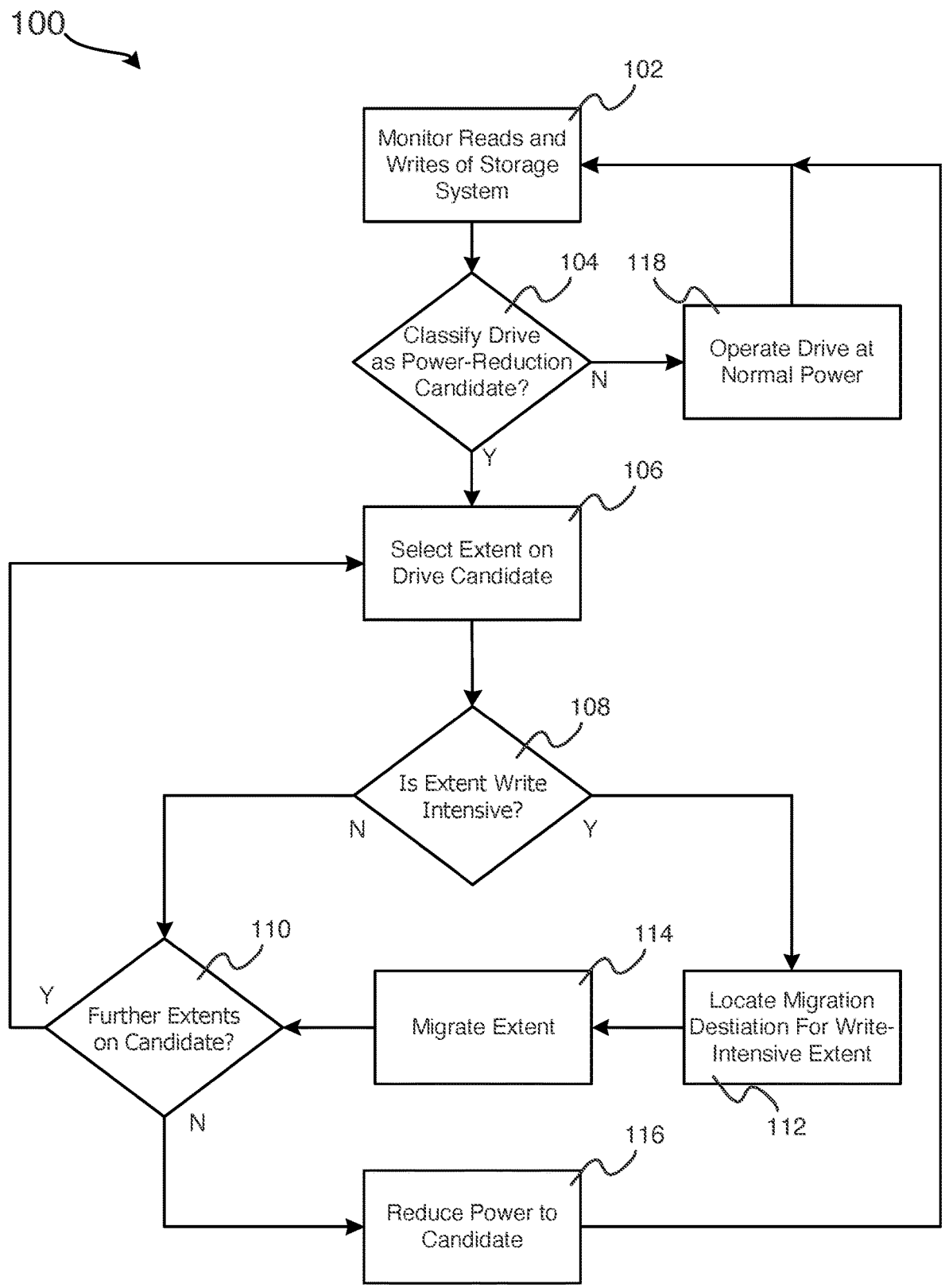
FIG. 1 depicts an example method of managing power control to a storage drive in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage drives, and more specifically, to controlling power provided to storage drives. While the present disclosure is not necessarily limited to such applications, various aspects of the disclosure may be appreciated through a discussion of various examples using this context.

Some modern computer systems utilize multiple storage drives that are combined together to provide a larger supply of storage for the system to use. For example, some servers use sets of solid-state drives (sometimes referred to herein as "SSDs") that are arrayed together to provide a fast storage pool to a processor on the server. In some of these servers, for example, data that the server may require for typical operations may be spread throughout the storage drives within the set, and thus the server may write to and read from several storage drives during a particular time window.

In some storage systems, the storage on a particular storage drive may be divided into "extents." Extents, as referred to herein, is a contiguous area on a storage drive that is reserved for one file or process of a particular application. Extents are often tracked by the starting bit and stopping bit of that contiguous area, but can also be treated (both by a developer or by a storage controller) as a discrete block of storage that is separate from other extents on the storage drive. Further, extents are also typically a uniform size throughout a storage system. Thus, when a portion of a typical storage drive is allocated to an extent, that portion should be the same size (i.e., same number of bits between the starting bit and ending bit) as the other portions of the storage drive allocated to other extents. Similarly, when a larger portion of storage space is allocated for extent storage, that larger portion of storage space should be the same size as a multitude of extents (absent addressing information, section headers, etc.). For this reason, extents can be seen by the storage controller as movable same-size blocks that fit within extent-size slots in storage. This uniform nature assists with quickly and efficiently tracking the location and migration of the data within extents. This concept is discussed throughout this application, but can be viewed visually in FIGS. 3A through 3C.

An extent stored on a storage drive, for example, may contain a file (or a fragment of a file) that an application requires access to in order to run. When that application is opened on a computer system, it may read the extent from its place on the storage drive without interacting with other extents on the storage drive. If that application updates the file on the extent, the storage system writes that update to the extent (either on the storage drive or in faster memory before returning the extent to the storage drive).

Because of their contiguous, discrete, and uniform nature, extents may often be moved throughout a drive or throughout a storage system without seriously impacting the ability of an application (or storage controller) to access the data on those extents. For example, a storage controller may migrate an extent to a faster storage drive if a program utilizes that extent frequently, even if other extents utilized by the program remain on the slower storage drive. This allows an extent (or extents) containing startup instructions for a program to be stored on a fast, frequently accessed drive, even if an extent containing rarely accessed user configurations for the same program is stored on a slower drive.

In order to be read from or written to, power must be applied to a storage drive. For this reason, a computer system with a large number of drives attached may require a large amount of power in order to access data necessary for the operations of that computer system. Over time, large amount of power can have significant impacts, such as the cost of providing the power over an extended period of time or the environmental impacts of consuming a large amount of power during the life of the computer system or of a drive therein. Thus, there are some detriments associated with powering a set of drives for a storage system over an extended period of time.

Typical storage drives specify an amount of power that should be applied to the drive in order to attain the expected performance of the drive. This amount of power may be referred to herein as "full power," and may vary by drive type, model, and manufacturer. The application of the power supplied to a storage drive is often controlled by some form of storage controller.

For example, some modern SSDs, such as non-volatile memory express (sometimes referred to herein as "NVMe") and other flash SSDs often provide a memory controller on the host system (e.g., a processor or more specialized storage controller) for a memory controller to establish the voltage applied to an NVMe SSD during operation. Typically, both in historical and modern contexts, such a storage controller delivers the full power specified by a drive.

However, as discussed, there can be long-term detriments in providing more power to a storage drive than is necessary. In addition to the financial and environmental cost of providing that power over an extended period of time, delivering an increased amount of power to a drive can cause that drive to perform at a higher temperature that it would perform if provided a reduced amount of power. This may increase the cooling requirements of the computer system in which the drive is installed. In computer systems with many drives operating simultaneously, this increase can be significant. Without meeting this increased cooling requirement, other components of the computer system may suffer performance losses due to operating at temperatures that are higher than optimal. This may lead for example, to throttling of those components (i.e., purposely reducing the performance of those components in order to lower the temperatures of the components).

Further, running a drive at full power over a long period of time can also decrease the longevity of that drive. For example, an NVMe drive may experience a greater rate of wear when operated at high power than when operated at low power. Thus, operating a set of drives at full power may cause some of the drives to fail before they may otherwise have failed, increasing the cost of maintaining the storage system over a long period of time.

Thus, it can be beneficial for a storage controller to reduce the power applied to a drive during operation when possible. Further, reducing the power applied to typical storage drives may not largely affect the performance of some drives, such as drives either completely or mainly performing read operations. However, reducing the power applied to a flash-protocol storage drive can reduce the performance of write operations on that storage drive, and thus power reduction on drives with a mix of read-and-write operations can have negative performance impacts. Thus, while reducing the power applied to some storage drives may lead to benefits in the long run (e.g., the financial benefits of supplying less power and replacing storage drives less frequently), the same reduction of power over the same time periods may also lead to offsetting detriments (e.g., the financial detriments of operating at reduced performance).

As used herein, the "performance" of a drive may refer to the drive's ability to perform a number of operations in over a given period or the drive's data bandwidth. In other words, the performance of a drive could refer to a drive's ability to process a number of I/O commands (regardless of their size) over time, process an amount of data over time (regardless of the number of I/O operations into which that data is segmented), or both. Thus, the detriments to drives with write extents may take the form of an inability to process operations quickly enough, an inability to process data quickly enough, or both.

In many use cases, the long-term detriments of reducing power applied to storage drives during operation outweighs the long-term benefits. Further, in some use cases, it can be unfeasible to estimate the detriments and benefits of reducing power to a drive with enough accuracy to predict whether reducing the drive will result in a net loss or net gain in the long term. For these reasons, the standard practice in many use cases provides full power to storage drives during drive operation, and thus the potential benefits of reducing power to those drives is not realized.

To address the issues identified above, some embodiments of the present disclosure identify storage drives as candidates for power-reduction operations based on the read and write patterns of those storage drives. In some embodiments, for example, the read operations and write operations of the drives of a storage system are monitored during a time window. Those read operations and write operations are analyzed to identify drives within the storage system that are good candidates for a power reduction. A drive may be a good candidate for a power reduction, for example, if a small proportion of the total operations on the candidate are write operations, or if a small proportion of the total extents on the candidate are write-intensive extents. Once a drive is identified as a candidate for a power reduction, particular write-intensive extents on the drive may be identified and migrated to other drives in the storage system, after which the power being applied to the drive may be reduced. Using the methods of the present disclosure, power may be reduced to only drives of a storage system that largely perform read operations, and thus the write-operation performance detriments (e.g., reduced I/O operations throughput or data bandwidth) of power reduction to the storage system may be avoided.

In some embodiments of the present disclosure, user or administrator of a storage system may have the capability to switch a storage component of the storage system (e.g., a drive, a group of drives, or all the drives in the storage system) between a performance mode or an energy-saving mode. In a performance mode, the storage component, a storage controller may deliver the full amount of power requested by the storage component to the storage component, regardless of read or write intensity. In an energy-saving mode, however, the power delivered to the drives in that storage component may be determined by the write intensity of those drives. This may enable the administrator to control, with desired granularity, the drives of a storage system on which the methods of this disclosure are practiced.

For example, a storage system may contain 3 RAID groups, each of which may contain 5 separate NVME drives. An administrator of the system may configure the first RAID group to operate in performance mode, and thus full power may be delivered to each of the drives in the first RAID group. The administrator may configure the second RAID group to operate in energy-saving mode, and thus the power delivered to each of the drives in the second RAID group may be determined by each drive's write intensity (for example, as determined by method 100 or 200 of FIGS. 1 and 2 respectively). Finally, while the administrator may configure the third RAID group to operate in performance mode, the administrator may manually configure one or more drives of the third RAID group to individually operate in energy-saving mode. At any time, however, the administrator may perform as system-wide override, causing all the drives of the storage system to switch to either the energy-saving mode or the performance mode.

FIG. 1 depicts an example method 100 of managing power control to a storage drive in accordance with embodiments of the present disclosure. Method 100 may be performed, for example, by a storage controller of a computer system (such as computer system 400 of FIG. 4), such as a processor of the computer system or a specialized storage-controller circuit installed within a computer system.

Method 100 begins with operation 102, in which the storage controller monitors the read operations and write operations of the storage drives (e.g., a set of NVMe drives) in the storage system. In some embodiments, this may include tracking, for each storage drive in the computer system, operations of the storage drive during a particular time window. For example, a storage controller may calculate the total amount of read operations, the total amount of write operations, and the total amount of read-and-write operations performed by an NVMe drive during the most-recent hour of operation.

In some embodiments, the storage controller may also record the extents from which data was read or to which data was written in these operations. For example, a write operation that updates a file containing user configurations may be associated with the extent that stores that configuration file, but a read operation that pulls the image files to be displayed in a graphic-user interface may associated with the extent (or extents) that stores those images. In some embodiments, this association between the operation and the extent may be recorded as a meta data flag that "links" the operation with the extent. For example, each operation recorded may be paired with a meta-data flag that includes the extent identifier of the extent written to or read from.

The information monitored in block 102 may be used to determine whether to classify a drive as a power-reduction candidate in block 104. A decision of whether to classify a drive as a power-reduction candidate in block 104 may be based on whether the drive is a write-intensive drive. In some embodiments, a drive may be identified as a write-intensive drive by calculating the percentage of the total operations performed by the drive that are write operations (i.e., dividing the number of write operations by the number of read-and-write operations). The number resulting from this calculation may sometimes be referred to herein as the "write proportion" or "total write proportion" of the drive. This total write proportion may then be compared against a maximum intensity threshold. If the write proportion is over the threshold, the drive may not be classified as a power-reduction candidate in block 104 because the drive performs too many write operations.

In some embodiments, a drive may also be classified as a write-intensive drive by calculating the percentage of the total extents on the drive that are write-intensive extents (i.e., dividing the number of write-extensive extents by the number of total extents). This type of classification may rely on information monitored in block 102 that links each operation performed by a drive to a particular extent on that drive. The number of write operations associated with an extent may be compared to the total number of operations associated with that extent (i.e., dividing the number of write operations by the total number of operations), resulting in a write proportion for that extent. That write proportion could then be compared against a write-intensity threshold to determine whether that extent is considered write intensive. If the percentage of write-intensive extents on a drive is below a threshold, that drive may be classified as a power-reduction candidate in block 104 because, for example, the drive has few extents that would need to be migrated off the drive before a power-reduction operation or that would be negatively affected by a power-reduction operation.

In some embodiments, the considerations involved in classifying a drive as a power-reduction candidate may be customized based on the goals of the storage system. For example, the operators of some storage systems may prefer to save money on storage-system operation wherever possible, and thus may set a write-intensity threshold (either for a drive's total operations or for the proportions of write extents on a drive) high. For example, a cloud server that backs up user's personal photos may benefit from keeping overall operational costs down and may benefit further by reducing the frequency of which backup drives fail due to consistently operating at full power. By setting the write-intensity thresholds high, storage drives with higher percentages of write operations may be classified as candidates for power reduction.

In some use cases, however, the performance of the storage system may have a very direct impact on the income derived from the system. For example, storage systems utilized by stock-market day traders may inhibit the ability to react to market developments if power is reduced to drives that contain many write extents. By setting the write-intensity thresholds low in these embodiments, the storage system may avoid power-reduction operations, protecting write performance.

Finally, some storage controllers may consider how long a drive has operated at full power when determining whether to classify a drive as a power-reduction candidate. For example, a storage controller may determine that a drive, because it has all write operations, has been operated at full power for six months. In order to prevent this drive from failing prematurely, the storage controller may classify the drive as a power-reduction candidate. In this example, a significant portion of the extents on the drive may be migrated off in order to prevent the performance of those extents from being negatively impacted by a power reduction.

If the storage controller, determines, in block 104, that a drive should not be classified as a power-reduction candidate, the controller proceeds to block 118, in which the storage controller operates the drive at normal power and proceeds back to operation 102. After the storage controller returns to operation 102, method 100 may be repeated in a new time window.

If, however, a drive is classified as a power-reduction candidate in block 104, the storage controller proceeds in method 100 to determine whether any extents should be migrated off the drive before power to the drive is reduced. This begins in block 106, in which a particular extent on the drive is selected to be examined. In block 108, the storage controller determines whether that extent is write intensive. In some embodiments, this may be performed using the same process discussed in connection to block 104. In other words, data recorded in block 102 may link each operation on a drive with a particular extent. For the extent selected in block 106, the number of write operations may be compared to the number of read operations and compared against a write-intensity threshold to determine whether the extent is write intensive. In some embodiments, this exact process may have already been performed in block 104, in which case the storage controller may simply recall the result of that process in block 108.

In some embodiments, however, a different threshold may be used in block 108. For example, a lower threshold may be used to determine whether an extent is write intensive in block 106, in which case the analysis may be repeated with the new threshold. In this example, some storage drives may be classified for power reduction, but some extents (or operations thereof) that caused a drive to be classified as a candidate may not be migrated off the drive before power is reduced to the drive. This may enable power reductions to some drives that are moderately write intensive without requiring the overhead of migrating extents throughout the storage system.

In some embodiments, however, block 104 may not consider information that links operations with extents. In these embodiments, determining whether the selected extent is write intensive may be performed initially in block 108, using information that was previously collected in block 102.

If a storage controller determines, in block 108, that the selected extent is not write intensive, the storage controller proceeds to block 110 to determine whether there are further extents on the candidate drive to analyze. If, however, the storage controller determines that the extent is write intensive, the storage controller proceeds to block 112, in which the storage controller attempts to locate another drive to which to migrate the selected extent.

Locating a migration destination in block 112 may include analyzing the write intensities of some or all other drives in the storage system. The storage controller may attempt to locate a storage drive that is more write intensive than the candidate drive. For example, the storage controller may locate the storage drive in the storage system that is the most write intensive. A drive that is particularly write intensive may be a good migration destination, because write intensive drives are less likely to have their power reduced in future power-reduction operations. Therefore, the write operations of the selected extent may be unlikely to be negatively affected by future power reductions on that destination drive. In some embodiments, the storage controller may also consider the performance abilities of the drives (e.g., I/O operations per second, data bandwidth) in the storage system. Some drives may have particularly good write performance, and thus the storage controller choose a drive that has the highest write performance when migrating a drive that has a particularly high write intensity.

In some embodiments, the storage controller may also consider the excess capacity of the potential destination drive. If, for example, a drive has particularly good write performance and is very write intensive, the drive may still be a poor migration destination for the selected extent if the drive has very low capacity (or would have very low capacity after the migration). Some drives, for example, suffer significant performance benefits when the capacity of the drive drops below a certain percentage. In some embodiments, these and other considerations may be considered together when determining an acceptable migration location for the selected extent.

Once a migration destination is located in block 112, the storage controller migrates the selected extent to the migration destination in block 114. In some embodiments, this may involve a combination of migration-read and migration-write operations. For example, the storage controller may first perform a migration-read operation on the selected extent on the candidate drive. In other words, the storage controller may read all the data of the extent into memory. The storage controller may then perform a migration-write operation of the selected extent onto the migration-destination drive. In some embodiments, this may increase the read-operation count of the candidate drive and the selected extent by one, and may also increase the write-operation count of the migration-destination drive and the selected extent by one.

In the short term, these increases may be negligible. However, in the long run, as a storage controller performs the power-reduction operations of the present disclosure on the storage system many times, these migrations may add up and skew the numbers of read-and-write operations for future performances of blocks 104 and block 108. For this reason, the storage controller may also record these migration-read operations and migration-write operations as power-reduction-migration operations. For example, the record of these operations may include a metadata flag that specifies "power migration" or "power reduction" to signify that the reads and writes should not be accounted for when monitoring the reads and writes of the storage system in block 102, determining whether to classify a drive as a power-reduction candidate in block 104, or determining whether an extent is write intensive in block 108.

After the migration, the storage controller proceeds to block 110 to determine whether there are further extents on the candidate drive that should be analyzed for potential migration (i.e., analyzed in block 106 and 108). If further extents that have not been analyzed are on the candidate, the storage controller proceeds to block 106 to select that extent (or one of those extents) for analysis.

If, however, there are no further extents on the candidate, a power reduction operation is performed on the candidate in block 116. In some embodiments, a power reduction operation may include reducing the power to the candidate drive by a pre-determined amount. For example, a storage controller may have two power levels it delivers to storage drives: "full" and "reduced." In this example, the storage controller may, in block 116, switch the power delivery from "full" to "reduced." In some embodiments, a more granular (or even completely analog) reduction of power may be performed. For example, a storage controller may calculate the write intensity of a drive after the migration and reduce power to the drive accordingly. For example, a storage controller may convert the write proportion of the drive to a value between 1.0 and 0.0, where 0.0 is 100% write operations and 1.0 is 0% write operations. This value may then be multiplied by a power reduction a power-reduction value (e.g., a percent by which to reduce the power) to result in the amount of power by which to reduce the drive.

Once the power being applied to a drive is reduced in block 116, the storage controller returns to block 102. At this point, method 100 may be repeated for another time window. In this second time window, the classification of the drive may be updated in 104, at which point the power applied to the drive may be updated. As discussed previously, the read-and-write operations performed at block 114 may not be included in the calculations of this iteration of method 100. For example, in some embodiments this iteration of block 102 may identify those operations by a meta-data tag associated with a record of those operations and subtracting them from the operations monitored at block 102.

In some embodiments, the time windows in which method 100 is performed (i.e., the time window during which the storage controller monitors the operations in block 102) may be altered based on the goals of the storage system. In some embodiments, performing method 100 may require system resources, and thus performing method 100 at a high frequency may have a negative impact on the performance of the system. If the write performance of the extents is not crucial, the negative performance of consistently performing the analysis of method 100 may outweigh the benefits of ensuring write-intensive extents are migrated off drives for which power is reduced, or the cost savings of reducing the power to a drive as soon as it becomes a candidate for power reduction. In these embodiments, a long monitoring time window (e.g., 24 hours) may be utilized. However, in some use cases the write performance of write-intensive extents may be very important, and therefore a shorter time window (e.g., 5 minutes) may be utilized.

Figure 2:
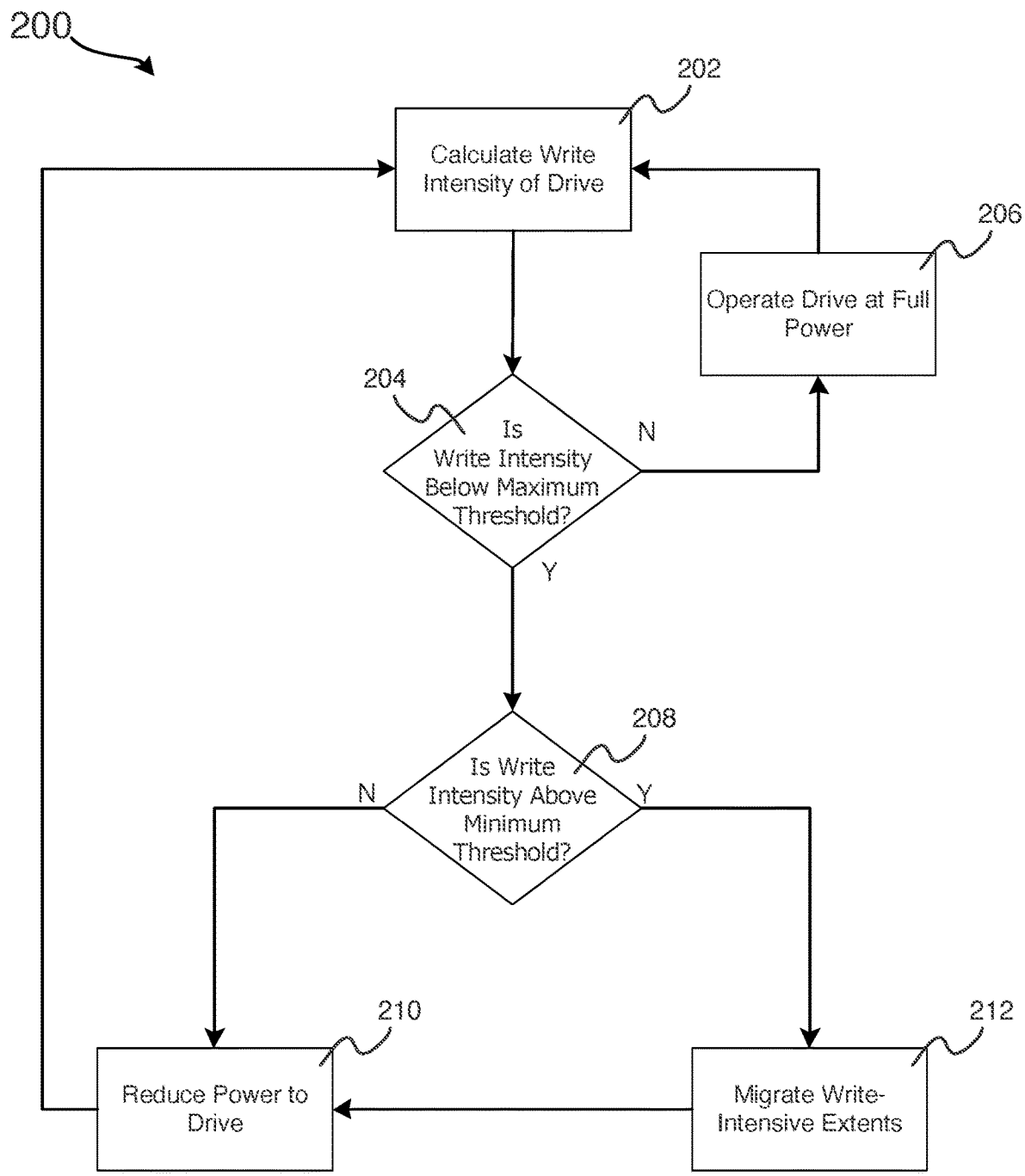
FIG. 2 depicts a second example method of managing power control to a storage drive in accordance with embodiments of the present disclosure.

FIG. 2 depicts a second example method 200 of managing power control to a storage drive in accordance with embodiments of the present disclosure. Method 200 may be performed, for example, by a storage controller of a computer system (such as computer system 400 of FIG. 4), such as a processor of the computer system or a specialized storage-controller circuit installed within a computer system.

In block 202, the write intensity of the drive is calculated by the storage controller. This calculation may be performed by any method discussed herein and otherwise consistent within the spirit of the embodiments of this disclosure. For example, a storage controller may divide the total number of write operations for the drive by the total number of read-and-write operations for the drive. The storage controller may also divide the number of write-intensive extents in the drive by the number of total extents in the drive.

Once the write intensity of the drive is calculated in block 202, the storage controller proceeds to determine whether the drive is below a maximum write-intensity threshold in block 204. This analysis may be similar to the analysis performed in block 104, and may be based on the drive's overall read and write operations, may be based on the number of write-intensive extents on the drive, or a mixture of both. If the storage controller determines that the write intensity is not below the maximum threshold in block 204, the storage controller operates the drive at full power in block 206. This may prevent a storage controller from reducing the power to a drive that is very write intensive and may also prevent the storage controller from attempting to migrate write extents off a drive when the drive has a high percentage of write extents. As illustrated, the storage controller proceeds from block 206 back to block 202, at which point method 200 may begin again, causing the drive to be continuously monitored for potential power reduction.

If, on the other hand, the storage controller determines, in block 204, that the write intensity is below the maximum threshold, the storage controller may classify the drive as a candidate for a power-reduction operation. However, the nature of the power-reduction operation may vary. Thus, at this point, the storage controller proceeds to determine, in block 208, whether the drive is above a minimum write-intensity threshold. A minimum write-intensity threshold may be used to identify drives that are below the write-intensity threshold (and thus for which a power-reduction may be beneficial) but that perform so few write operations (or so few write-intensive extents) that migrating an extent off the drive before a power reduction would not lead to significant performance benefits. Thus, if the storage controller determines, in block 208, that the drive's write intensity is not above the minimum threshold, the storage controller may proceed to reduce the power to the drive in operation 210. This power reduction may be similar to any power reduction that is performed elsewhere in this disclosure and that is otherwise consistent with the spirit of the present embodiments. For example, the power reduction may be similar to the power reduction performed in block 116 of FIG. 1.

However, if the storage controller determines, in block 208, that the drive is above the minimum write-intensity threshold, the storage controller may proceed to block 212. At block 212, the storage controller performs operations to migrate write-intensive extents off the drive, such as identifying write-intensive extents by comparing them against a threshold and identifying migration destinations for those write-intensive extents. In some embodiments, the operations performed at block 212 may be similar to those performed in block 106 through 114 in FIG. 1.

After the storage controller migrates write-intensive extents off the drive, the storage controller reduces power to the drive in block 210, and then returns to block 202, at which point method 200 may be repeated.

In some embodiments, methods of the present disclosure may be performed on a continuous basis throughout an entire storage system (e.g. a set of NVMe SSDs connected to a host or storage controller) to optimize the storage system. For example, in some embodiments thresholds by which drives are classified as a candidate for a power reduction (e.g., the proportion of write operations necessary on a drive before it is classified as a candidate) and thresholds by which extents are chosen for migration (i.e., the proportion of writes necessary on an extent before it is migrated) may be set low, causing, over time, all write-intensive extents to be located on particular drives, and read-intensive extents to be located on the remainder of the storage system. In these situations, power of a high proportion of drives may be reduced without affecting write performance of the storage system. In some embodiments, some read-intensive extents may also be migrated to free up more capacity on certain drives for more write-intensive extents. Finally, in some embodiments the amount of time that each drive is operated at full power may be monitored. When that amount of time crosses a threshold, the drive may be automatically classified as a candidate for a power reduction. At this point, all (or most) of the write-intensive extents may be removed from that drive. This may include, in some instances, completely swapping the contents of the drive with a read-intensive drive. All together, these methods may maximize the number of storage drives in a storage system that may be operated at low power, while preventing any particular drive from operating at low power for an extended period of time, reducing the likelihood that any particular drive fails prematurely.

Figure 3C:
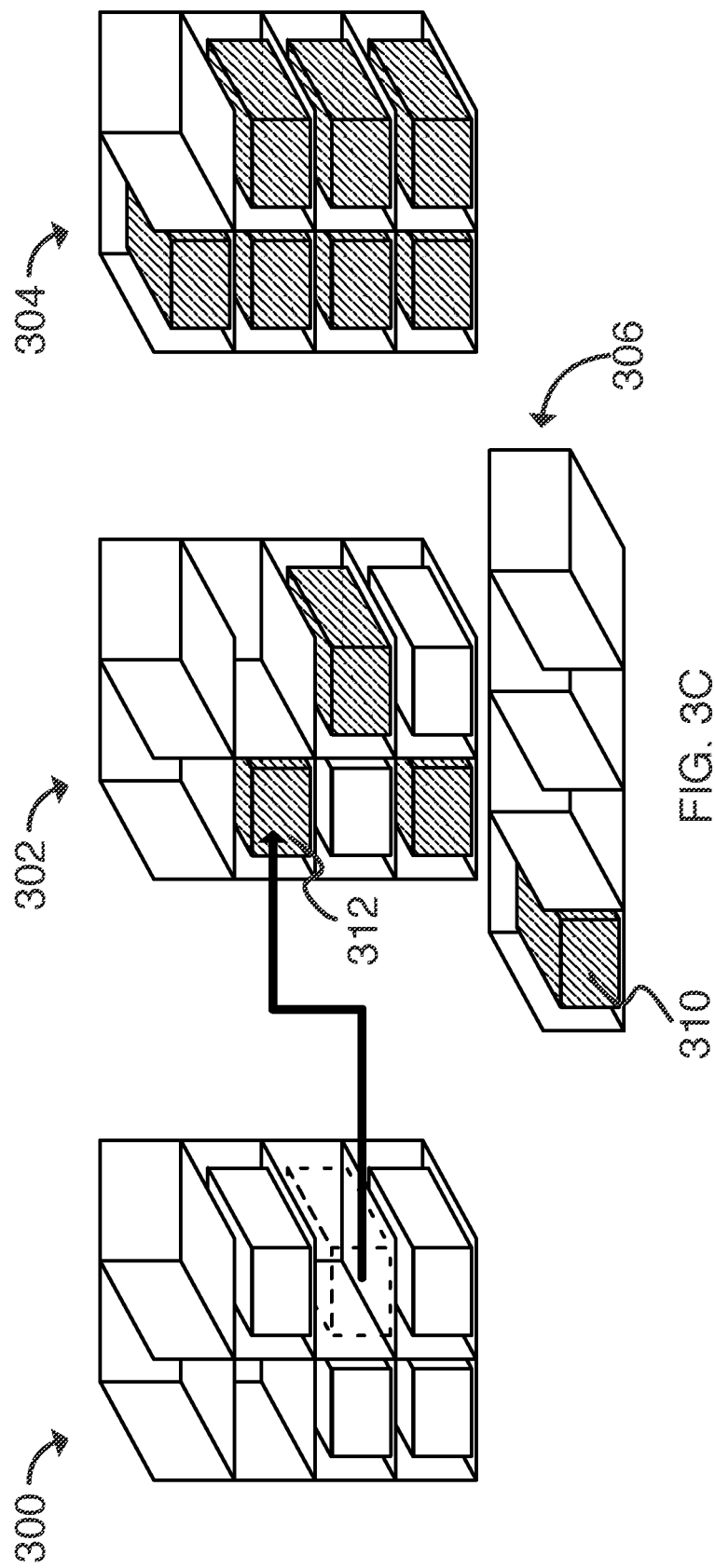
FIG. 3C depicts a third view of the example set of storage drives after a power-reduction migration has been performed in accordance with embodiments of the present disclosure.

FIGS. 3A through 3C depict an abstracted view of an example set of drives 300, 302, and 304 in which the power-reduction methods of the present disclosure are performed. It is of note that FIGS. 3A through 3C are intended to be simplified presentations of storage drives and extents solely for the purpose of understanding. Thus, the particular presentation, proportions, or other specific properties of FIGS. 3A through 3C are not intended to be exact representations of the performance of the methods of the present disclosure.

For example, FIGS. 3A through 3C depict three storage drives 300, 302, and 304 (e.g., NVMe storage drives) and one faster drive space 306 (e.g., storage class memory). However, these numbers, and the proportions between them, are purely for the sake of understanding. For example, faster drive space could actually represent multiple fast drives or one fast drive. Further, while FIGS. 3A through 3C depict six times as much space in storage drives 300-304 (24 extent slots) as in faster drive space 306 (4 extent slots), in some use cases a larger or smaller percentage of the total storage system may be dedicated to faster storage space, in which case faster drive space 306 could be depicted as more than 4 extent slots per 24 storage-drive extent slots. Finally, in some use cases multiple types of drives may be used in storage drives 300, 302, and 304 and faster drive space 306. For example, in some use cases drives 300 and 302 may be NVMe drives but drive 304 may be a different drive format with similar power properties. Similarly, faster drive space 306 may be composed of one SCM drive, one ram disk, and some cache, or other storage types that are faster than storage drives 300 through 304. Faster drive space 306 could even be composed of the same types of drives as storage drives 300, 302, and 304, but could be arrayed together (e.g., in a RAID format) to achieve faster overall performance of the drive space. Thus, FIGS. 3A through 3C could represent a storage system with many types of drives, or one type of drive in both storage spaces.

FIG. 3A depicts first view of storage drives 300, 302, and 304 and fast storage space 306. In some use cases, a storage controller may be capable of monitoring the operations of drives 300-304 and migrating extents from the storage drives 300-304 to the faster drive space 306 when those extents are used frequently.

Storage drives 300-304 each contain several extents, illustrated as blocks in storage slots in the drives. Read-intensive extents are represented by solid-white blocks (e.g., read extent 308), and write-intensive extents are represented by hashed blocks (e.g., write-intensive extents 310 and 312). Thus, as illustrated in FIG. 3A, storage drive 300 contains 2 write-intensive extents, 4 read-intensive extents, and 25% available capacity; storage drive 302 contains 2 write-intensive extents, 2 read-intensive extents, and 50% available capacity; and storage drive 304 contains 7 write-intensive extents, 0 read-intensive extents, and 12.5% available capacity.

A storage controller that manages the storage system in which drives 300, 302, and 304 are located may be performing a power-reduction method similar to method 100 or method 200. For example, the storage controller may have analyzed all of drives 300, 302, and 304 and determined that they are not candidates for a power-reduction operation because none of the drives have a write intensity below 25%, as determined by the proportion of write-intensive extents and read-intensive extents. Based on the proportion of write-intensive extents, drive 300 has the lowest write intensity of 0.3333333333 (i.e., 33%). Drive 302 has a write intensity of 50%, and drive 304 has a write intensity of 100%.

FIG. 3B depicts a second view of drives 300, 302, and 304. As illustrated, a storage controller is migrating write-intensive extent 310 from storage drive 300 to faster drive space 306. This may be because, for example, a program has accessed write-intensive extent 310 frequently over the recent several time windows. In some embodiments of the present disclosure, this migration may also trigger the storage controller to analyze the operations of storage drive 300 to determine whether it is a candidate for a power-reduction operation.

By determining the updated write intensity of drive 300, the storage controller would determine that the drive now has a write intensity of 20%, which, in the example described above, is less than the 25% maximum write-intensity threshold necessary for a drive to be considered a drive candidate. Thus, the storage controller may determine to perform a power-reduction operation on drive 300. However, because drive 300 still contains write-intensive extent 312, a power-reduction operation may have a negative performance impact on the drive (and potentially the entire storage system) by reducing the performance of using extent 312. In other words, because write-intensive extent 312 may be largely accessed to write to, the storage system's use of write-intensive extent 312 may be negatively impacted by a reduction of the power applied to drive 300. Thus, the storage controller may determine to migrate write-intensive extent 312 off drive 300.

FIG. 3C depicts a third view of drives 300, 302, and 304. In FIG. 3C, the storage controller is migrating write-intensive extent 312 from storage drive 300 to storage drive 302. The storage controller may have chosen storage drive 302 because it was more write intensive than storage drive 300. It is also possible that storage drive 302 is being supplied with full power, and therefore the performance of write-intensive extent 312 may not be negatively impacted on drive 302. In some embodiments, the storage controller may also have considered migrating write-intensive extent 312 to storage drive 304. However, as illustrated, storage drive 304 is almost full, and migrating write-intensive extent 312 to storage drive 304 may cause it to become completely full. This could, in some use cases, significantly negatively affect the performance of storage drive 304 (e.g., lowering the maximum number of operations the drive could perform per second or the amount of data the drive could write per second).

Further, migrating another write-intensive extent (here, extent 312) to storage drive 304 may negatively affect the performance of storage drive 304 even if storage drive 304 were not in danger of becoming so full that its performance would be affected (for example, the 8 slots shown in storage drive 304 may only be a portion of the storage space, in some embodiments). For example, as illustrated, storage drive 304 is largely write intensive. Because write-intensive extents tend to require more I/O operations than read-intensive extents, storage drive 304 may perform a significantly high amount of I/O operations during average operation. It is possible that storage drive 304 may be operating close to or at its performance limit (e.g., the write speed of the drive may be too slow to process the long list of I/O commands in a reasonable time), and thus it is possible that migrating write-intensive extent 312 to storage drive 304 may cause drive 304 to become overwhelmed and unable to keep up with the I/O requirements of the extents it is storing.

For example, a storage controller may be capable of determining the performance limits of each drive in the system. When the storage controller is considering whether to migrate extent 312 to storage drive 304, if the storage controller determines that the migration would likely cause storage drive 304 to operate above those performance limits, the storage controller may migrate extent 312 elsewhere.

These performance limits, as previously discussed, may take the form of a maximum number of I/O commands that storage drive 304 can perform over a period of time (e.g., per second), a data bandwidth of storage drive 304 (e.g., a total amount of data that the drive can process over time), or both.

For these reasons, the negative performance effects of migrating write-intensive extent 312 to storage drive 304 may outweigh the benefits of either the power reduction to drive 300 or avoiding the performance impacts of the power reduction on write-intensive extent 312. Because storage drive 302 did have available capacity, the storage controller selected storage drive 302 as a migration destination.

In some embodiments not depicted by FIGS. 3A-3C, the storage controller may also be configured to migrate read-intensive extents to prepare for future power-reduction-operation migrations. For example, the two read extents in storage drive 302 may be migrated to storage drive 300. This could free up capacity in storage drive 302 in case write-intensive extent 310 were recalled from faster drive space 306. At that point, write-intensive extent 310 could be migrated to storage drive 302, preventing the power reduction to storage drive 300 from affecting the performance of write-intensive extent 310.

It is of note that the perspective from which some terms and calculations of this present disclosure have been presented has been chosen for the sake of clarity, but is not intended to be limiting. For example, the app uses the term write-intensive, read intensive, and calculations of those terms throughout. However, in most cases the same result could be achieved by reversing the perspective of the method.

For example, rather than identifying a read-intensive drive by comparing a total write proportion of the drive (e.g. 15%) to a maximum write-intensity threshold (e.g., 20%) in block 104 of FIG. 1, a storage controller could identify a non-write-intensive drive by comparing a total read proportion of the drive (e.g., 85%) to a minimum read-intensity threshold (e.g., 80%). In either example, the end result of the method would be similar. For this reason, the presentation of the embodiments of the present disclosure are intended to read on the literal embodiments presented and obvious variants thereof.

Figure 4:
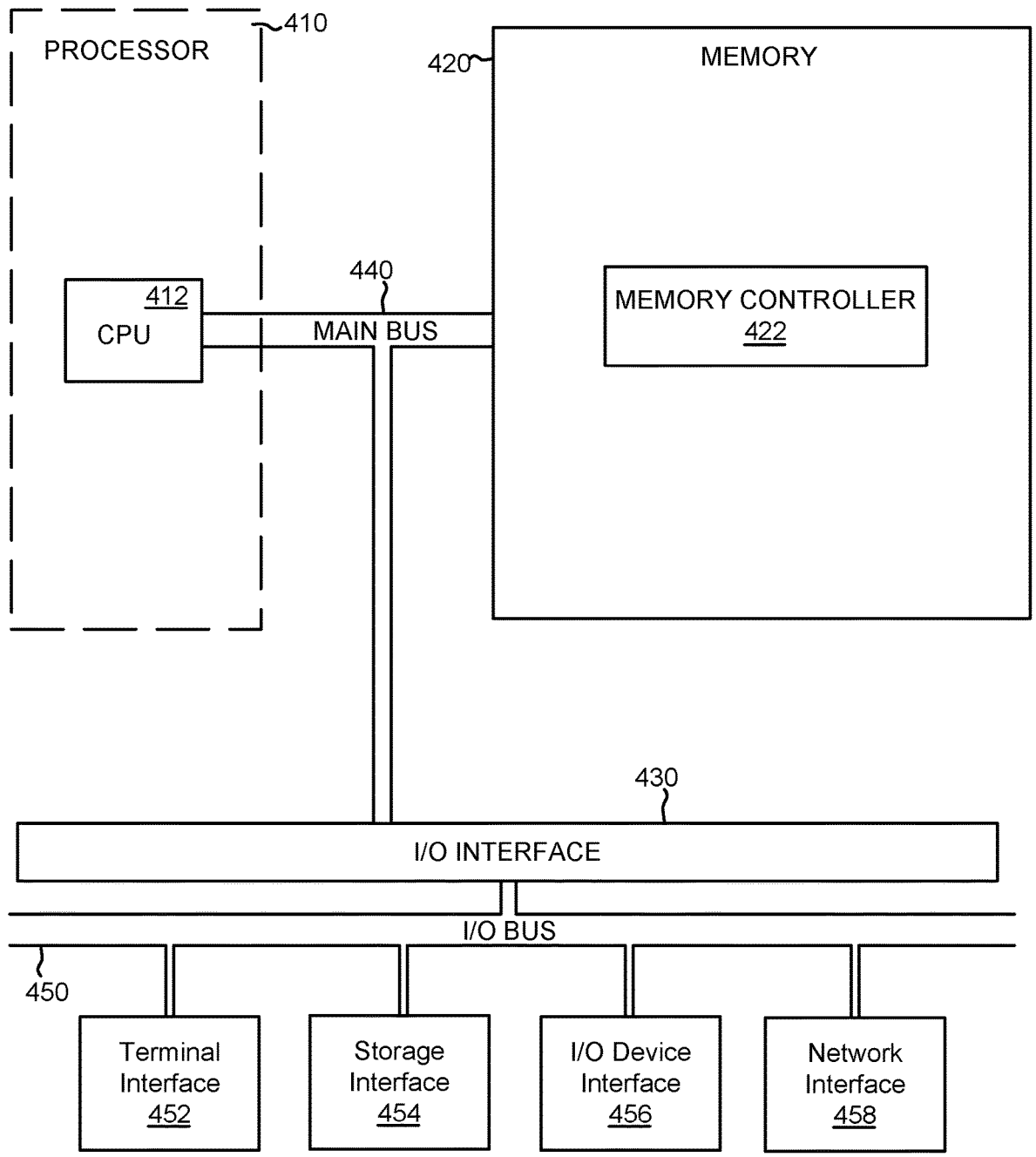
FIG. 4 depicts the representative major components of a computer system that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
monitoring a set of read operations and a set of write operations for a set of drives in a storage system during a first time window;
calculating, based on the monitoring, a write intensity of a first drive in the set of drives;
classifying, based on the write intensity, the first drive as a candidate for power reduction;
identifying, based on the monitoring, a write-intensive extent on the first drive;
migrating a read-intensive extent off a second drive to provide space for the write-intensive extent;
migrating the write-intensive extent to the second drive in the set of drives prior to reducing the power to the first drive to mitigate write-performance impacts of reducing power to the first drive; and
reducing power to the first drive.

2. The method of claim 1, wherein the calculating comprises:

identifying a number of read operations performed by the first drive during the first time window;
identifying a number of write operations performed by the first drive during the first time window;
adding the number of read operations to the number of write operations, resulting in a number of total operations performed by the first drive during the first time window; and
dividing the number of write operations by the number of total operations resulting in a total write proportion for the first drive.

3. The method of claim 1, wherein the calculating comprises:
identifying a number of extents that were write intensive during the first time window;
identifying a total number of extents in the first drive; and
dividing the number of write-intensive extents by the total number of extents, resulting in a write-extent proportion for the first drive.

4. The method of claim 1, wherein the classifying comprises:
comparing the write intensity of the first drive to a maximum intensity threshold; and
determining that the write intensity is below the maximum intensity threshold.

5. The method of claim 4, wherein the classifying further comprises:
comparing the write intensity of the first drive to a minimum intensity threshold; and
determining that the write intensity is above the minimum intensity threshold.

6. The method of claim 1, wherein the migrating comprises:
performing a migration-read operation on the extent on the first drive;
performing a migration-write operation of the extent to the second drive; and
recording the migration-read operation and the migration-write operation as power-reduction-migration operations.

7. The method of claim 1, wherein the monitoring comprises subtracting power-reduction-migration operations from the set of read operations and the set of write operations.

8. The method of claim 1, wherein reducing power to the first drive disproportionately affects the performance of write operations on the drive more than read operations on the drive.

9. A system comprising:
a processor; and
a memory in communication with the processor, the memory containing program instructions that, when executed by the processor, are configured to cause the processor to perform a method, the method comprising:
monitoring a set of read operations and a set of write operations for a set of drives in a storage system during a first time window, wherein the monitoring comprises subtracting power-reduction-migration operations from the set of read operations and the set of write operations;
calculating, based on the monitoring, a write intensity of a first drive in the set of drives;
classifying, based on the write intensity, the first drive as a candidate for power reduction;
identifying, based on the monitoring, a write-intensive extent on the first drive;
migrating the write-intensive extent to a second drive in the set of drives prior to reducing the power to the first drive to mitigate write-performance impacts of reducing power to the first drive; and
reducing power to the first drive.

10. The system of claim 9, wherein the method performed by the processor further comprises:
identifying a number of read operations performed by the first drive during the first time window;
identifying a number of write operations performed by the first drive during the first time window;
adding the number of read operations to the number of write operations, resulting in a number of total operations performed by the first drive during the first time window; and
dividing the number of write operations by the number of total operations resulting in a total write proportion for the first drive.

11. The system of claim 9, wherein the calculating comprises:
identifying a number of extents that were write intensive during the first time window;
identifying a total number of extents in the first drive; and
dividing the number of write-intensive extents by the total number of extents, resulting in a write-extent proportion for the first drive.

12. The system of claim 9, wherein the classifying comprises:
comparing the write intensity of the first drive to a maximum intensity threshold; and
determining that the write intensity is below the maximum intensity threshold.

13. The system of claim 9, wherein the method performed by the processor further comprises:
migrating a read-intensive extent off the second drive to provide space for the write-intensive extent.

14. The system of claim 9, wherein the method performed by the processor further comprises:
performing a migration-read operation on the extent on the first drive;
performing a migration-write operation of the extent to the second drive; and
recording the migration-read operation and the migration-write operation as power-reduction-migration operations.

15. A computer program product, the computer program product comprising a computer readable storage medium having program instructions embodied therewith, the program instructions executable by a computer to cause the computer to:
monitor a set of read operations and a set of write operations for a set of drives in a storage system during a first time window;
calculate, based on the monitoring, a write intensity of a first drive in the set of drives;
classify, based on the write intensity, the first drive as a candidate for power reduction;
identify, based on the monitoring, a write-intensive extent on the first drive;
migrate a read-intensive extent off a second drive to provide space for the write-intensive extent;
migrate the write-intensive extent to the second drive in the set of drives prior to reducing the power to the first drive to mitigate write-performance impacts of reducing power to the first drive; and
reduce power to the first drive.

16. The computer program product of claim 15, wherein the program instructions further cause the computer to:
- identify a number of read operations performed by the first drive during the first time window;
- identify a number of write operations performed by the first drive during the first time window;
- add the number of read operations to the number of write operations, resulting in a number of total operations performed by the first drive during the first time window; and
- divide the number of write operations by the number of total operations resulting in a total write proportion for the first drive.

17. The computer program product of claim 15, wherein the calculating comprises:
- identifying a number of extents that were write intensive during the first time window;
- identifying a total number of extents in the first drive; and
- dividing the number of write-intensive extents by the total number of extents, resulting in a write-extent proportion for the first drive.

18. The computer program product of claim 15, wherein the classifying comprises:
- comparing the write intensity of the first drive to a maximum intensity threshold; and
- determining that the write intensity is below the maximum intensity threshold.

19. The computer program product of claim 15, wherein the monitoring comprises subtracting power-reduction-migration operations from the set of read operations and the set of write operations.

20. The computer program product of claim 15, wherein the program instructions further cause the computer to:
- perform a migration-read operation on the extent on the first drive;
- perform a migration-write operation of the extent to the second drive; and
- record the migration-read operation and the migration-write operation as power-reduction-migration operations.

* * * * *